(No Model.)
P. UNFRIED.
GATE.
No. 375,903. Patented Jan. 3, 1888.
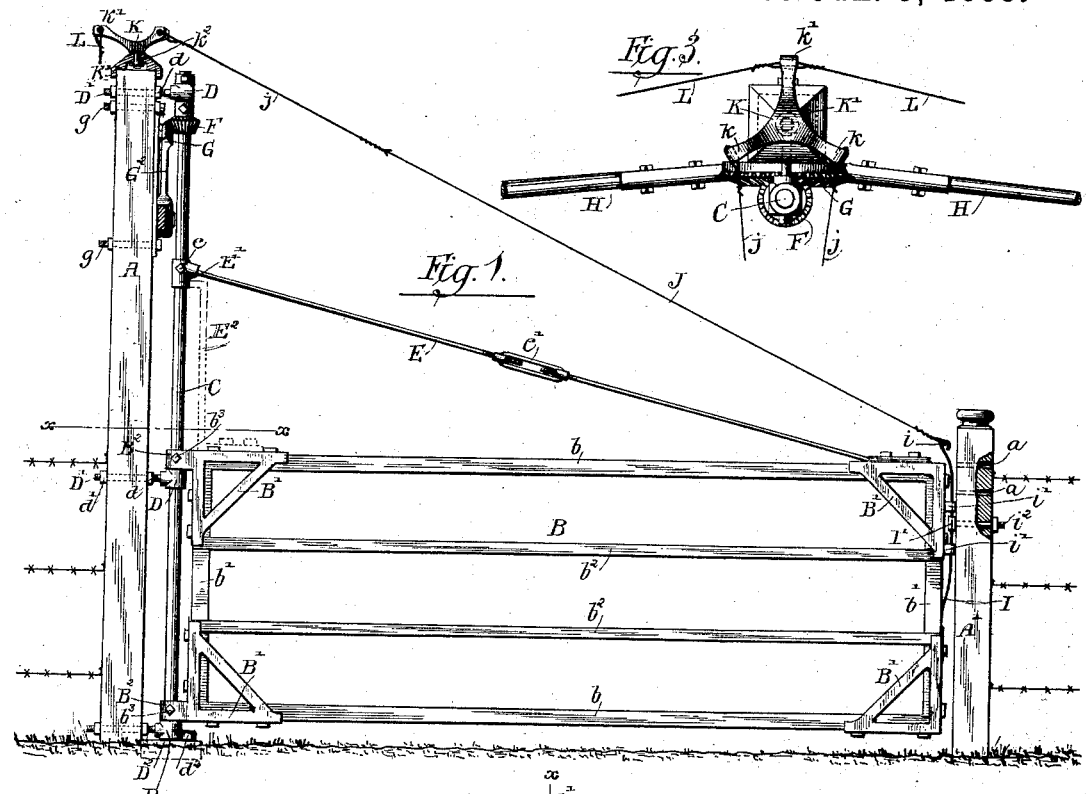
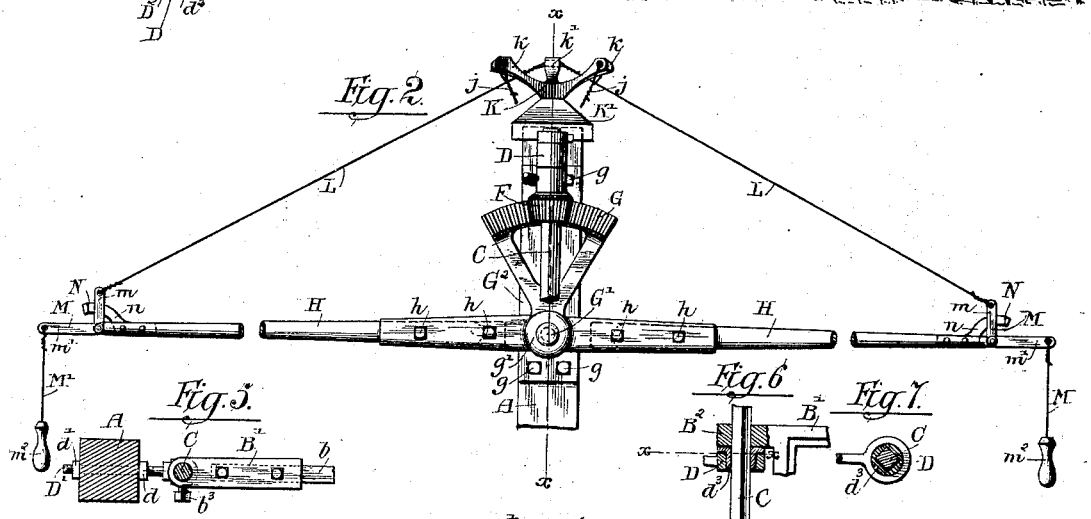
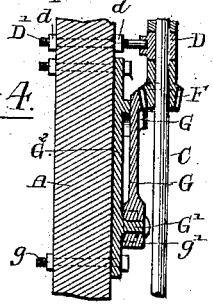
Witnesses:
Louis M. F. Whitehead
Jas. D. Phillips
Inventor:
Peter Unfried
by Dayton & Poole
Attorneys

UNITED STATES PATENT OFFICE.

PETER UNFRIED, OF CHICAGO, ILLINOIS.

GATE.

SPECIFICATION forming part of Letters Patent No. 375,903, dated January 3, 1888.

Application filed January 24, 1887. Serial No. 225,211. (No model.)

*To all whom it may concern:*

Be it known that I, PETER UNFRIED, of Chicago, in the county of Cook and State of Illinois, have invented certain new and useful Improvements in Gates; and I do hereby declare that the following is a full, clear, and exact description thereof, reference being had to the accompanying drawings, and to the letters of reference marked thereon, which form a part of this specification.

This invention relates to a novel actuating device for farm and other gates; and it consists in the matters hereinafter described, and pointed out in the appended claim.

In the accompanying drawings, illustrating my invention, Figure 1 is a side view of a gate embodying my invention. Fig. 2 is a detail elevation of the main parts of the actuating devices upon the gate-post. Fig. 3 is a detail plan view of the parts of the gate-actuating devices shown in Fig. 2. Fig. 4 is a detail section taken upon line $x\,x$ of Fig. 2. Fig. 5 is a detail plan view taken upon line $x\,x$ of Fig. 1. Fig. 6 is a view illustrating a modified form of the bar supporting the gate and devices for pivotally sustaining said bar. Fig. 7 is a horizontal section taken upon line $x\,x$ of Fig. 6.

As shown in the said drawings, A A' are the gate-posts, and B the gate. For the general purposes of my invention the said gate may be made in any desired or preferred manner; but as herein shown it consists of longitudinal top and bottom rails $b\,b$, vertical end rails, $b'\,b'$, connected at the corners of the gate by iron corner-pieces B', and intermediate rails, $b^2\,b^2$. The gate-post A, to which the gate is hinged, is made considerably higher than the post A' at the free edge of the gate, and at the side of said post A adjacent to the gate is pivotally supported a vertical shaft, C, to which the gate is rigidly attached, and which turns in its bearings upon the post as the gate is swung. Pivotal connection between the said shaft C and the post is desirably formed by means of bearings D, consisting, as shown, of metal blocks vertically apertured to afford bearings for the shaft, and provided with horizontal threaded stems D', which pass through suitable horizontal apertures in the post, the bearings being held in place by means of nuts $d\,d'$, placed upon said threaded shanks D' at opposite sides of the post. By moving the nuts $d\,d'$ upon said shanks the bearings D D may obviously be moved horizontally toward and from the post, thereby enabling the adjustment of the bearings into alignment with the shaft to be easily accomplished, while at the same time affording a cheap and simple means of attaching the bearings to the post. The lower bearing D, or that adjacent to the ground, is preferably made in the form of a stop to hold the shaft C from vertical movement, and said bearing is preferably provided with a horizontal flange or projection, $d^2$, forming a broad surface adapted to rest upon a block or stone, $D^2$, which may be desirably placed beneath it to take part of the strain from the shanks D' of the bearings and from the post.

The gate is attached to the shaft C by means of lugs or projections $B^2$, rigidly attached to the gate and apertured for the passage of the said shaft. In the particular construction herein illustrated the said lugs or projections $B^2$ are cast upon the metal corner-pieces B' B' of the gate, and, as illustrated in Figs. 1 and 5, set-screws $b^3$ are inserted through said lugs or projections $B^2$, for the purpose of holding the shaft from turning in the said lugs or projections.

E is an inclined tie-rod attached to the gate at or near the free end of the latter and connected with the shaft C at a point considerably above the top of the gate. The means for attaching the tie-rod to the shaft herein shown consists of a sleeve, E', surrounding the shaft and provided with a set-screw, $e$, whereby the sleeve may be firmly clamped upon the said shaft. The said tie-rod E obviously serves to hold the free end of the gate from sinking or sagging, and may, if desired, be provided with a turn-buckle, $e'$, or other means whereby its length may be adjusted.

At or near the upper end of the shaft C is affixed a toothed pinion, F, which intermeshes with the gear-segment G, which is pivoted upon a stud, G', secured to the post A below the pinion, said segment having attached to it, at or near its pivotal point, horizontallyarranged arms or levers H H, to the outer ends of which power may be applied for actuating the gear-segment G, and thereby turning the pinion F and the shaft C for opening and closing the gate. The stud G' is preferably formed upon or attached to a plate, G², which is bolted to the vertical face of the post by bolts $g\ g$ in the manner shown, and the segment G is desirably provided with a hub, $g'$, to which are attached integral metal arms $h\ h$, secured by bolts or otherwise to the main parts of the levers H H, desirably made in the instance illustrated of wood. The said arms H will be made of considerable length, and will extend to a point convenient to be reached by a person riding or walking along the roadway leading through the gate, and the devices described will thus afford a simple and convenient means for actuating the gate.

The construction described, wherein the gate is sustained by a shaft, C, having bearings on the gate-post in the manner described, is not only advantageous as a means of communicating motion to the gate from the gear segment and pinion, but said shaft also affords an advantageous means of supporting the gate, having, among other advantages, that of enabling the gate to be readily lifted above its normal position and there sustained in case its movement in its usual position is prevented by snow. To accomplish the shifting of the gate vertically it is only necessary to loosen the set-screws $b^3\ b^3$, when the projections B² can be slid upwardly upon the shaft and the set-screws then tightened to hold the gate in its elevated position. In shifting the gate in this manner the sleeve E', to which the tension-rod E is attached, will of course be moved upwardly the same distance that the gate is raised. If desired, for convenience of manipulation, the said sleeve E' may be rigidly connected to the gate by means of a vertical brace, E², (indicated in dotted lines in Fig. 1,) so that the said sleeve will always be held at the proper relative distance from the top of the gate.

In Figs. 6 and 7 I have shown a construction of the vertical shaft C wherein the latter is made square in cross-sectional form and the lugs or projections B² B² upon the gate are of similar shape, so that the gate will be held from turning upon the shaft independently of the employment of set-screws $b^3\ b^3$ for this purpose. When the shaft is made square, suitable bearings may be afforded for it in the sleeves D by means of thimbles $d^3$, provided with square apertures to receive the rod and having cylindric exterior surfaces to enter corresponding-shaped bearing-apertures in the said bearings D, and flanges $d^4$ to rest upon the top of said bearings D, as clearly illustrated in said Figs. 6 and 7.

It is obviously desirable in a gate adapted for actuation by a device of the character described that means should be provided for disengaging the latch of the gate, so that the latter may be moved from the point at which the gate is opened. I have herein shown automatically-operating latch-actuating devices, which are constructed as follows:

I is the latch, herein shown as consisting of a vertically-arranged bar flexibly connected at its lower end with the free edge of the gate and provided at its upper end with a loop, $i$, to which is attached an actuating cord, chain, or wire, J. The said latch I is desirably held or guided between two guide-loops, $i'\ i'$, upon the gate, and is adapted to engage a notched keeper, I', attached to the post A'. In connection with a gate adapted for vertical adjustment in the manner above described, the keeper I' will preferably be attached to the gate-post by means of a threaded shank or bolt, $i^2$, adapted for engagement with either one of a number of apertures, $a\ a$, in the post. The wire J is forked or divided into two branches or strands, $j\ j$, in its part adjacent to the post A, and upon the upper end of said post is mounted a pivoted frame or casting, K, having two arms, $k\ k$, to which the wires $j\ j$ are attached, and a third arm, $k'$, to which are attached two wires, L L, extending to points adjacent to the outer end of the levers H H. The frame or casting K is mounted to rotate about a vertical axis, the bearing or support for said frame or casting herein shown consisting of a pin, $k^2$, upon the lower part of the casting, extending through and having bearing in a metal cap, K', secured upon the top of the post A, as clearly shown in the drawings. The arms $k\ k$, to which the wires $j\ j$ are attached, extend laterally from the pivotal axis of the casting K, so that when the casting is rotated in either direction one of the wires $j\ j$ will be drawn in the direction toward the post, with the effect of drawing the latch backward and releasing the latter from the keeper I'. The third arm, $k'$, of the casting K is located midway between the arms $k\ k$ and extends toward the rear of the post, so that when force is applied to either of the wires L L attached thereto the frame K will be swung about its pivot and the latch thereby released, in the manner above described. Any convenient means may be applied at the outer end of the lever H to facilitate the manipulation of the wires L L for the purpose of releasing the latch. One convenient device for this purpose is herein shown, which consists of a bell-crank lever, M, pivoted to the free or outer end of the lever H, and having an upwardly-extending arm, $m$, to which the ends of the wire L are attached, and a horizontal arm, $m'$, to the free end of which is attached a string or wire, M', having at its lower end a handle, $m^2$, which may be grasped for the purpose of drawing downwardly upon the arm M' of the bell-crank lever, thereby actuating the wire L for the purpose of moving the latch.

N is a stop rigidly fixed to the lever H for the purpose of limiting the movement of the bell-crank lever M, said stop being, as shown, attached to the said lever by means of a curved arm, $n$. The gear-segment G is actuated for opening the gate by pulling downwardly upon the free end of one of the levers H, so that by giving an oscillatory movement to the bell-crank lever M, in the manner shown, the latch may be disengaged and the gate opened by a continuous downward pull upon the handle $M^2$ or upon the outer end of the arm $m'$ of the bell-crank lever, it being entirely obvious that when the arms H H are horizontal, as shown in Fig. 2, a downward pull upon the said handle $m^2$ will first swing the bell-crank lever about its pivot, and thereby draw upon the wire L, so as to open the gate-latch, and that as soon as the said lever strikes the stop N a further downward pull upon the handle will move the lever H downward, and thereby cause the opening of the gate.

I claim as my invention—

The combination, with a gate-post or other support and a gate, of a shaft, C, bearings upon the said post or support for said shaft, and an inclined tie-rod connecting the free part or end of the gate with the said shaft, the said gate and the tie-rod having sliding connection with the shaft, whereby the gate and tie-rod may be raised and lowered, substantially as described.

In testimony that I claim the foregoing as my invention I affix my signature in presence of two witnesses.

PETER UNFRIED.

Witnesses:
C. CLARENCE POOLE,
CHARLES T. LORING.